United States Patent
Jhu et al.

(10) Patent No.: US 12,542,928 B2
(45) Date of Patent: Feb. 3, 2026

(54) GENERAL CONSTRAINT INFORMATION FOR VIDEO CODING

(71) Applicant: BEIJING DAJIA INTERNET INFORMATION TECHNOLOGY CO., LTD., Beijing (CN)

(72) Inventors: Hong-Jheng Jhu, San Diego, CA (US); Xiaoyu Xiu, San Diego, CA (US); Yi-Wen Chen, San Diego, CA (US); Tsung-Chuan Ma, San Diego, CA (US); Wei Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 88 days.

(21) Appl. No.: 17/986,762

(22) Filed: Nov. 14, 2022

(65) Prior Publication Data

US 2023/0087759 A1 Mar. 23, 2023

Related U.S. Application Data

(63) Continuation of application No. PCT/US2021/031789, filed on May 11, 2021.
(Continued)

(51) Int. Cl.
*H04N 19/70* (2014.01)
*H04N 19/172* (2014.01)
(Continued)

(52) U.S. Cl.
CPC .......... *H04N 19/70* (2014.11); *H04N 19/172* (2014.11); *H04N 19/174* (2014.11); *H04N 19/30* (2014.11); *H04N 19/593* (2014.11); *H04N 19/82* (2014.11)

(58) Field of Classification Search
CPC .... H04N 19/172; H04N 19/174; H04N 19/30; H04N 19/593; H04N 19/70; H04N 19/82
See application file for complete search history.

(56) References Cited

U.S. PATENT DOCUMENTS

| 10,448,025 B1 | 10/2019 | Xu et al. |
| 2020/0021833 A1 | 1/2020 | Xu et al. |

(Continued)

FOREIGN PATENT DOCUMENTS

| CN | 107646195 A | 1/2018 |
| CN | 110730354 A | 1/2020 |
| WO | 2020060843 A1 | 3/2020 |

OTHER PUBLICATIONS

Benjamin Bross et al., "Versatile Video Coding (Draft 9), "Joint Video Experts Team (JVET) of ITU-T SG 16 WP 3 and ISO/IEC JTC 1/SC 29/WG 11, JVET-R0286 18th Meeting, by teleconference, Apr. 15-24, 2020 (Year: 2020).*
(Continued)

*Primary Examiner* — Jessica M Prince
(74) *Attorney, Agent, or Firm* — Arch & Lake LLP; Hao Tan; Shen Wang

(57) ABSTRACT

A method, apparatus, and a non-transitory computer-readable storage medium for decoding a video signal are provided. In one method, a decoder may receive constraint flags, and at least one of the constraint flags indicates whether a slice is an intra slice. The decoder may obtain prediction samples based on the at least one of the constraint flags.

15 Claims, 6 Drawing Sheets

Related U.S. Application Data

(60) Provisional application No. 63/025,153, filed on May 14, 2020.

(51) Int. Cl.
*H04N 19/174* (2014.01)
*H04N 19/30* (2014.01)
*H04N 19/593* (2014.01)
*H04N 19/82* (2014.01)

(56) References Cited

U.S. PATENT DOCUMENTS

| | | | | |
|---|---|---|---|---|
| 2021/0314587 A1* | 10/2021 | Choi | .................. | H04N 19/70 |
| 2021/0314623 A1* | 10/2021 | Chang | .................. | H04N 19/136 |
| 2021/0321130 A1* | 10/2021 | Li | .................. | H04N 19/46 |
| 2022/0321922 A1* | 10/2022 | Kim | .................. | H04N 19/593 |
| 2023/0027478 A1* | 1/2023 | Deng | .................. | H04N 19/172 |
| 2023/0096533 A1* | 3/2023 | De Lagrange | ....... | H04N 19/124 375/240.03 |
| 2023/0199224 A1* | 6/2023 | McCarthy | .............. | H04N 19/82 375/240.12 |
| 2024/0137571 A1* | 4/2024 | Deng | .................. | H04N 19/174 |

OTHER PUBLICATIONS

International Search Report in Application No. PCT/US2021/031789 dated Sep. 1, 2021(3p).

Benjamin Bross et al., 'Versatile Video Coding (Draft 9)', Joint Video Experts Team (JVET) of ITU-T SG 16 WP 3 and ISO/IEC JTC 1/SC 29/WG 11,JVET-R2001-v9, 18th Meeting,by teleconference, Apr. 15-24, 2020, (526p).

Yao-Jen Chang et al., 'AhG9: On general constraint information syntax', Joint Video Experts Team (JVET) of ITU-T SG 16 WP 3 and ISO/IEC JTC 1/SC 29/WG 11,JVET-R0286 18th Meeting,by teleconference, Apr. 15-24, 2020,(5p).

Rickard Sjoberg, et al., 'AHG9: General constraint information semantics constraints and a flag for PH in SH', Joint Video Experts Team (JVET) of ITU-T SG 16 WP 3 and ISO/IEC JTC 1/SC 29/WG 11 JVET-R0227-v1, 18th Meeting, by teleconference,Apr. 15-24, 2020,(2p).

Virginie Drugeon, 'AHG12: Subpictures and conformance cropping window', Joint Video Experts Team (JVET) of ITU-T SG 16 WP 3 and ISO/IEC JTC 1/SC 29/WG 11, JVET-R0093,18th Meeting,by teleconference,Apr. 15-24, 2020,(3p).

Yong He, et al, "AHG9: A summary of proposals on general constraints information (GCI)", Joint Video Experts Team (JVET) of ITU-T SG 16 WP 3 and ISO/IEC JTC 1/SC 29/WG 11 19th Meeting: by teleconference, Jun. 22-Jul. 1, 2020, (18p).

* cited by examiner

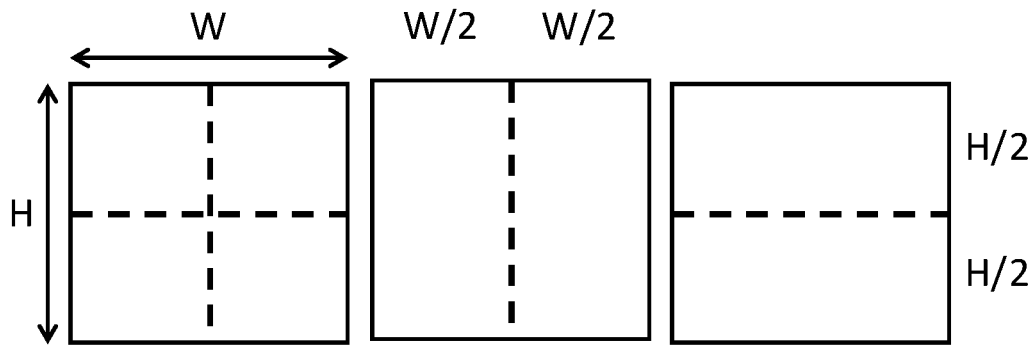
FIG. 3A  FIG. 3B  FIG. 3C
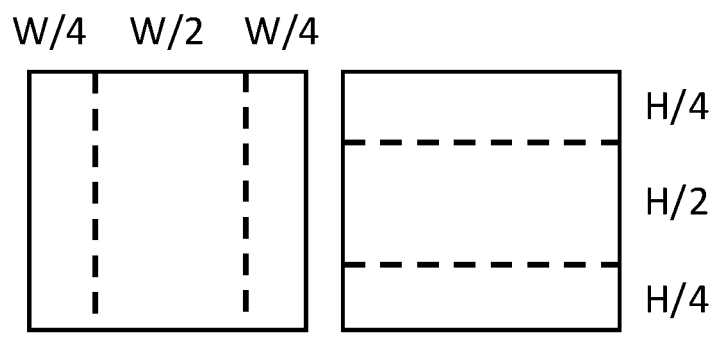
FIG. 3D  FIG. 3E
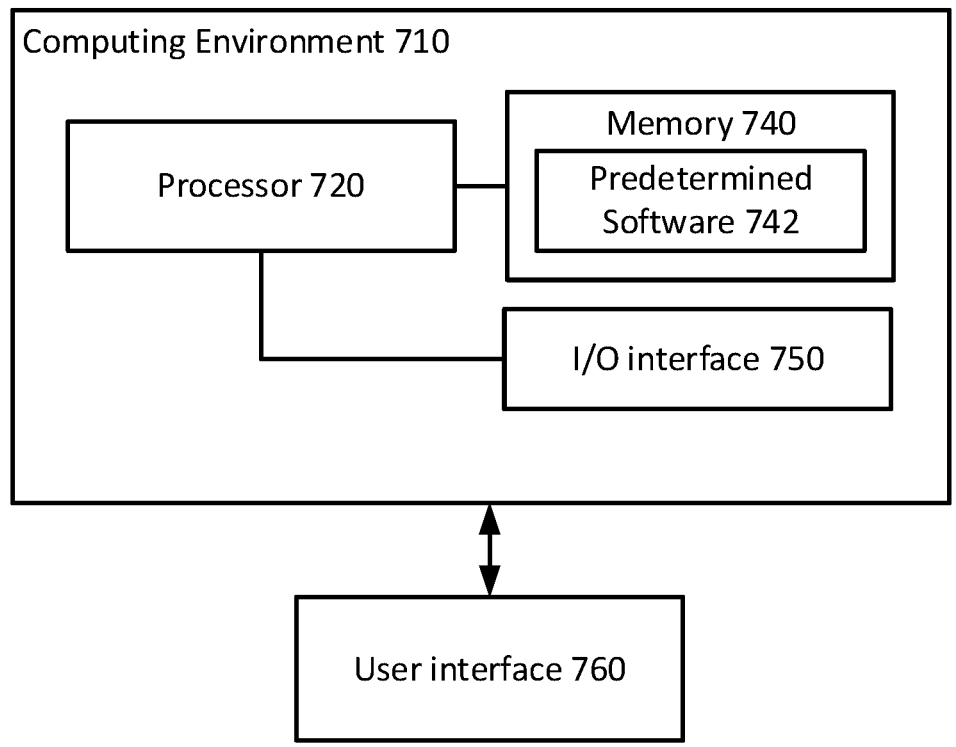
FIG. 7

GENERAL CONSTRAINT INFORMATION FOR VIDEO CODING

CROSS-REFERENCE TO RELATED APPLICATION

This application is a continuation of PCT International Application No. PCT/US2021/031789, filed on May 11, 2021, which is based upon and claim priority to Provisional Applications No. 63/025,153, filed on May 14, 2020, the entire contents thereof are incorporated herein by reference for all purposes.

TECHNICAL FIELD

This disclosure is related to video coding and compression. More specifically, this application relates to general constraint information in video bitstream applicable to one or more video coding standards.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods and apparatus relates to general constraint information coding in video coding.

According to a first aspect of the present disclosure, a method for decoding a video signal is provided. The method may include receiving, by a decoder, constraint flags, wherein at least one of the constraint flags indicates whether a slice is an intra slice; and obtaining, at the decoder, prediction samples based on the at least one of the constraint flags.

According to a second aspect of the present disclosure, a computing device is provided. The computing device may include one or more processors, a non-transitory computer-readable memory storing instructions executable by the one or more processors. The one or more processors may be configured to receive constraint flags, wherein at least one of the constraint flags indicates whether a slice is an intra slice; and obtain prediction samples based on the at least one of the constraint flags.

According to a third aspect of the present disclosure, a non-transitory computer-readable storage medium having stored therein instructions is provided. When the instructions are executed by one or more processors, the instructions may cause the one or more processors to receive at least one constraint flag. The at least one constraint flag may indicate whether a slice is an intra slice. The instructions may also cause the one or more processors to perform: receiving, by a decoder, constraint flags, wherein at least one of the constraint flags indicates whether a slice is an intra slice; and obtaining, at the decoder, prediction samples based on the at least one of the constraint flags.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 3A is a diagram illustrating block partitions in a multi-type tree structure, according to an example of the present disclosure.

FIG. 3B is a diagram illustrating block partitions in a multi-type tree structure, according to an example of the present disclosure.

FIG. 3C is a diagram illustrating block partitions in a multi-type tree structure, according to an example of the present disclosure.

FIG. 3D is a diagram illustrating block partitions in a multi-type tree structure, according to an example of the present disclosure.

FIG. 3E is a diagram illustrating block partitions in a multi-type tree structure, according to an example of the present disclosure.

FIG. 7 is a diagram illustrating a computing environment coupled with a user interface, according to an example of the present disclosure.

DETAILED DESCRIPTION

Figure 1:
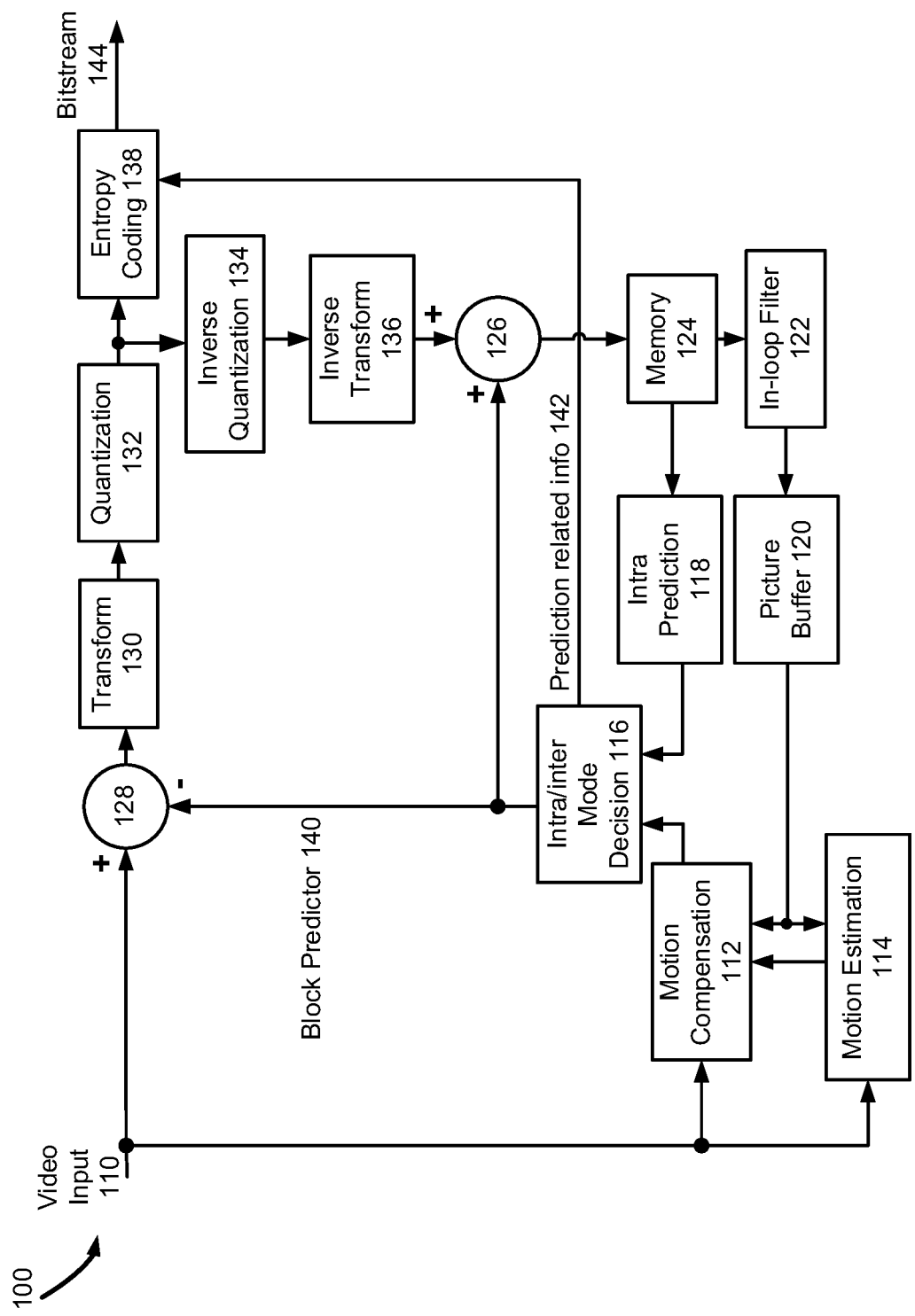
FIG. 1 is a block diagram of an encoder, according to an example of the present disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure, as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc., may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (WET) was formed in October 2015 by ITU-T VECG and ISO/IEC MPEG to begin a significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Like HEVC, the VVC is built upon the block-based hybrid video coding framework.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called coding units (CUs)). In VTM-1.0, a CU can be up to 128×128 pixels. However, different from the HEVC, which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU), and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

As shown in FIGS. 3A, 3B, 3C, 3D, and 3E, there are five splitting types, quaternary partitioning, horizontal binary partitioning, vertical binary partitioning, horizontal ternary partitioning, and vertical ternary partitioning.

FIG. 3A shows a diagram illustrating block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example, based on the rate-distortion optimization method. The prediction block is then subtracted from the current video block, and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO), and adaptive in-loop filter (ALF) may be applied on the reconstructed CU before it is put in the reference picture store and used to code future video blocks. To form the output video bitstream, coding mode (inter or intra), prediction mode information, motion information, and quantized residual coefficients are all sent to the entropy coding unit to be further compressed and packed to form the bitstream.

Figure 2:
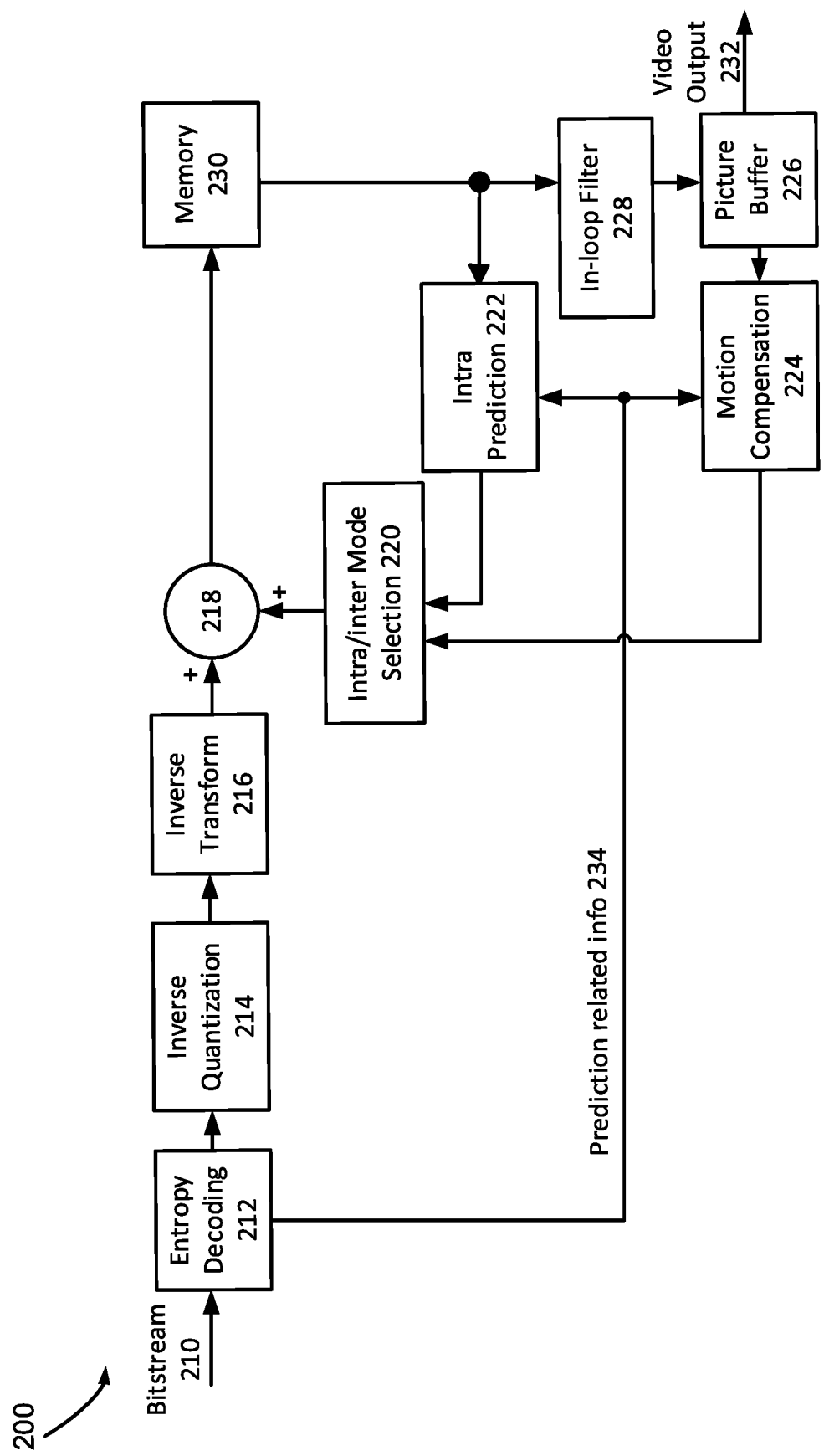
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bitstream is first entropy decoded at entropy decoding unit. The coding mode and prediction information are sent to either the spatial prediction unit (if intra coded) or the temporal prediction unit (if inter-coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

In general, the basic intra prediction scheme applied in the VVC is kept the same as that of the HEVC, except that several modules are further extended and/or improved, e.g., matrix weighted intra prediction (MIP) coding mode, intra sub-partition (ISP) coding mode, extended intra prediction with wide-angle intra directions, position-dependent intra prediction combination (PDPC) and 4-tap intra interpolation. The main focus of the disclosure is to improve the existing general constraint information design in the VVC standard. The related background knowledge is elaborated in the following sections.

Like HEVC, VVC uses a Network Abstraction Layer (NAL) unit based bitstream structure. A coded bitstream is partitioned into NAL units which, when conveyed over lossy packet networks, should be smaller than the maximum transfer unit size. Each NAL unit consists of a NAL unit header followed by the NAL unit payload. There are two conceptual classes of NAL units. Video coding layer (VCL) NAL units containing coded sample data, e.g., coded slice NAL units, whereas non-VCL NAL units that contain metadata typically belonging to more than one coded picture, or where the association with a single coded picture would be meaningless, such as parameter set NAL units, or where the information is not needed by the decoding process, such as SEI NAL units.

VVC inherits the parameter set concept of HEVC with a few modifications and additions. Parameter sets can be either part of the video bitstream or can be received by a decoder through other means (including out-of-band transmission using a reliable channel, hard coding in encoder and decoder, and so on). A parameter set contains an identification, which is referenced, directly or indirectly, from the slice header as discussed in more detail later. The referencing process is known as "activation." Depending on the parameter set type, the activation occurs per picture or per sequence. The concept of activation through referencing was introduced, among other reasons, because implicit activation by virtue of the position of the information in the bitstream (as common for other syntax elements of a video codec) is not available in case of out-of-band transmission.

The video parameter set (VPS) was introduced to convey information that is applicable to multiple layers as well as sub-layers. The VPS was introduced to address these shortcomings as well as to enable a clean and extensible high-level design of multilayer codecs. Each layer of a given video sequence, regardless of whether they have the same or different sequence parameter sets (SPS), refers to the same VPS.

In VVC, SPSs contain information which applies to all slices of a coded video sequence. A coded video sequence starts from an instantaneous decoding refresh (IDR) picture, or a BLA picture, or a CRA picture that is the first picture in the bitstream and includes all subsequent pictures that are not an IDR or BLA picture. A bitstream consists of one or more coded video sequences. The content of the SPS can be roughly subdivided into six categories: 1) a self-reference (its own ID); 2) decoder operation point related information (profile, level, picture size, number sub-layers, and so on); 3) enabling flags for certain tools within a profile, and associated coding tool parameters in case the tool is enabled; 4) information restricting the flexibility of structures and transform coefficient coding; 5) temporal scalability control; and 6) visual usability information (VUI), which includes HRD information.

For decoder operation point related information in SPS, there is a list of constraint flags that indicate properties that cannot be violated in the entire bitstream. The constraint flags are encapsulated into their own syntax structures, general_constraint_info( ). The syntax and the associated semantic of general constraint information in the current VVC draft specification is illustrated in Table 1 and Table 2, respectively.

TABLE 1

| General_constraint information syntax | |
| --- | --- |
| general_constraint_info( ) { | Descriptor |
|   general_non_packed_constraint_flag | u(1) |
|   general_frame_only_constraint_flag | u(1) |
|   general_non_projected_constraint_flag | u(1) |
|   general_one_picture_only_constraint_flag | u(1) |
|   intra_only_constraint_flag | u(1) |
|   max_bitdepth_constraint_idc | u(4) |
|   max_chroma_format_constraint_idc | u(2) |
|   single_layer_constraint_flag | u(1) |
|   all_layers_independent_constraint_flag | u(1) |
|   no_ref_pic_resampling_constraint_flag | u(1) |
|   no_res_change_in_clvs_constraint_flag | u(1) |

TABLE 1-continued

| General_constraint information syntax | |
| --- | --- |
|   one_tile_per_pic_constraint_flag | u(1) |
|   pic_header_in_slice_header_constraint_flag | u(1) |
|   one_slice_per_pic_constraint_flag | u(1) |
|   one_subpic_per_pic_constraint_flag | u(1) |
|   no_qtbtt_dual_tree_intra_constraint_flag | u(1) |
|   no_partition_constraints_override_constraint_flag | u(1) |
|   no_sao_constraint_flag | u(1) |
|   no_alf_constraint_flag | u(1) |
|   no_ccalf_constraint_flag | u(1) |
|   no_joint_cbcr_constraint_flag | u(1) |
|   no_mrl_constraint_flag | u(1) |
|   no_isp_constraint_flag | u(1) |
|   no_mip_constraint_flag | u(1) |
|   no_ref_wraparound_constraint_flag | u(1) |
|   no_temporal_mvp_constraint_flag | u(1) |
|   no_sbtmvp_constraint_flag | u(1) |
|   no_amvr_constraint_flag | u(1) |
|   no_bdof_constraint_flag | u(1) |
|   no_dmvr_constraint_flag | u(1) |
|   no_cclm_constraint_flag | u(1) |
|   no_mts_constraint_flag | u(1) |
|   no_sbt_constraint_flag | u(1) |
|   no_lfnst_constraint_flag | u(1) |
|   no_affine_motion_constraint_flag | u(1) |
|   no_mmvd_constraint_flag | u(1) |
|   no_smvd_constraint_flag | u(1) |
|   no_prof_constraint_flag | u(1) |
|   no_bcw_constraint_flag | u(1) |
|   no_ibc_constraint_flag | u(1) |
|   no_ciip_constraint_flag | u(1) |
|   no_gpm_constraint_flag | u(1) |
|   no_ladf_constraint_flag | u(1) |
|   no_transform_skip_constraint_flag | u(1) |
|   no_bdpcm_constraint_flag | u(1) |
|   no_palette_constraint_flag | u(1) |
|   no_act_constraint_flag | u(1) |
|   no_lmcs_constraint_flag | u(1) |
|   no_cu_qpdelta_constraint_flag | u(1) |
|   no_chroma_qp_offset_constraint_flag | u(1) |
|   no_dep_quant_constraint_flag | u(1) |
|   no_sign_data_hiding_constraint_flag | u(1) |
|   no_tsrc_constraint_flag | u(1) |
|   no_mixed_nalu_types_in_pic_constraint_flag | u(1) |
|   no_trail_constraint_flag | u(1) |
|   no_stsa_constraint_flag | u(1) |
|   no_rasl_constraint_flag | u(1) |
|   no_radl_constraint_flag | u(1) |
|   no_idr_constraint_flag | u(1) |
|   no_cra_constraint_flag | u(1) |
|   no_gdr_constraint_flag | u(1) |
|   no_aps_constraint_flag | u(1) |
|   while( !byte_aligned( )) | |
|     gci_alignment_zero_bit | f(1) |
|   gci_num_reserved_bytes | u(8) |
|   for( i = 0; i < gci_num_reserved_bytes; i++ ) | |
|     gci_reserved_byte[ i ] | u(8) |
| } | |

TABLE 2

General constraint information semantics general_non_packed_constraint_flag equal to 1 specifies that there shall not be any frame packing arrangement SEI messages present in the bitstream of the OlsInScope. general_non_packed_constraint_flag equal to 0 does not impose such a constraint.
  NOTE 1 - Decoders may ignore the value of general_non_packed_constraint_flag, as there are no decoding process requirements associated with the presence or interpretation of frame packing arrangement SEI messages.
general_frame_only_constraint_flag equal to 1 specifies that OlsInScope conveys pictures that represent frames. general_frame_only_constraint_flag equal to 0 specifies that OlsInScope conveys pictures that may or may not represent frames.
  NOTE 2 - Decoders may ignore the value of general_frame_only_constraint_flag, as there are no decoding process requirements associated with it.

TABLE 2-continued

General constraint information semantics general_non_projected_constraint_flag equal to 1 specifies that there shall not be any
equirectangular projection SEI messages or generalized cubemap projection SEI messages
present in the bitstream of the OlsInScope. general_non_projected_constraint_flag equal to
0 does not impose such a constraint.
    NOTE 3 - Decoders may ignore the value of general_non_projected_constraint_flag, as
    there are no decoding process requirements associated with the presence or
    interpretation of equirectangular projection SEI messages and generalized cubemap
    projection SEI messages.
general_one_picture_only_constraint_flag equal to 1 specifies that there is only one
coded picture in the bitstream. general_one_picture_only_constraint_flag equal to 0 does
not impose such a constraint.
intra_only_constraint_flag equal to 1 specifies that sh_slice_type shall be equal to I.
intra_only_constraint_flag equal to 0 does not impose such a constraint. When
general_one_picture_only_constraint_flag is equal to 1, the value of
intra_only_constraint_flag shall be equal to 1.
max_bitdepth_constraint_idc specifies that sps_bit_depth_minus8 shall be in the range
of 0 to max_bitdepth_constraint_idc, inclusive.
max_chroma_format_constraint_idc specifies that sps_chroma_format_idc shall be in
the range of 0 to max_chroma_format_constraint_idc, inclusive.
single_layer_constraint_flag equal to 1 specifies that sps_video_parameter_set_id shall
be equal to 0. single_layer_constraint_flag equal to 0 does not impose such a constraint.
When general_one_picture_only_constraint_flag is equal to 1, the value of
single_layer_constraint_flag shall be equal to 1.
all_layers_independent_constraint_flag equal to 1 specifies that
vps_all_independent_layers_flag shall be equal to 1.
all_layers_independent_constraint_flag equal to 0 does not impose such a constraint.
no_ref_pic_resampling constraint_flag equal to 1 specifies that
sps_ref_pic_resampling_enabled_flag shall be equal to 0.
no_ref_pic_resampling_constraint_flag equal to 0 does not impose such a constraint.
no_res_change_in_clvs_constraint_flag equal to 1 specifies that
sps_res_change_in_clvs_allowed_flag shall be equal to 0.
no_res_change_in_clvs_constraint_flag equal to 0 does not impose such a constraint.
one_tile_per_pic_constraint_flag equal to 1 specifies that each picture shall contain only
one tile. one_tile_per_pic_constraint_flag equal to 0 does not impose such a constraint.
pic_header_in_slice_header_constraint_flag equal to 1 specifies that each picture shall
contain only one slice and the value of sh_picture_header_in_slice_header_flag in each
slice shall be equal to 1. pic_header_in_slice_header_constraint_flag equal to 0 does not
impose such a constraint.
one_slice_per_pic_constraint_flag equal to 1 specifies that each picture shall contain only
one slice. one_slice_per pic_constraint_flag equal to 0 does not impose such a constraint.
When pic_header_in_slice_header_constraint_flag is equal to 1, the value of
one_slice_per_pic_constraint_flag shall be equal to 1.
one_subpic_per_pic_constraint_flag equal to 1 specifies that each picture shall contain
only one subpicture. one_subpic_per_pic_constraint_flag equal to 0 does not impose such a
constraint. When one_slice_per_pic_constraint_flag is equal to 1, the value of
one_subpic_per_pic_constraint_flag shall be equal to 1.
no_qtbtt_dual_tree_intra_constraint_flag equal to 1 specifies that
sps_qtbtt_dual_tree_intra_flag shall be equal to 0. no_qtbtt_dual_tree_intra_constraint_flag
equal to 0 does not impose such a constraint. When max_chroma_format_constraint_idc is
equal to 0, the value of no_qtbtt_dual_tree_intra_constraint_flag shall be equal to 1.
no_partition_constraints_override_constraint_flag equal to 1 specifies that
sps_partition_constraints_override_enabled_flag shall be equal to 0.
no_partition_constraints_override_constraint_flag equal to 0 does not impose such a
constraint.
no_sao_constraint_flag equal to 1 specifies that sps_sao_enabled_flag shall be equal to 0.
no_sao_constraint_flag equal to 0 does not impose such a constraint.
no_alf_constraint_flag equal to 1 specifies that sps_alf_enabled_flag shall be equal to 0.
no_alf_constraint_flag equal to 0 does not impose such a constraint.
no_ccalf_constraint_flag equal to 1 specifies that sps_ccalf_enabled_flag shall be equal to
0. no_ccalf_constraint_flag equal to 0 does not impose such a constraint. When
max_chroma_format_constraint_idc is equal to 0 or no_alf_constraint_flag is equal 1, the
value of no_ccalf_constraint_flag shall be equal to 1.
no_joint_cbcr_constraint_flag equal to 1 specifies that sps_joint_cbcr_enabled_flag shall
be equal to 0. no_joint_cbcr_constraint_flag equal to 0 does not impose such a constraint.
When max_chroma_format_constraint_idc is equal to 0, the value of
no_joint_cbcr_constraint_flag shall be equal to 1.
no_mrl_constraint_flag equal to 1 specifies that sps_mrl_enabled_flag shall be equal to 0.
no_mrl_constraint_flag equal to 0 does not impose such a constraint.
no_isp_constraint_flag equal to 1 specifies that sps_isp_enabled_flag shall be equal to 0.
no_isp_constraint_flag equal to 0 does not impose such a constraint.
no_mip_constraint_flag equal to 1 specifies that sps_mip_enabled_flag shall be equal to
0. no_mip_constraint_flag equal to 0 does not impose such a constraint.
no_ref_wraparound_constraint_flag equal to 1 specifies that
sps_ref_wraparound_enabled_flag shall be equal to 0. no_ref_wraparound_constraint_flag
equal to 0 does not impose such a constraint. When intra_only_constraint_flag is equal to
1, the value of no_ref_wraparound_constraint_flag shall be equal to 1.

TABLE 2-continued

General constraint information semantics no_temporal_mvp_constraint_flag equal to 1 specifies that
sps_temporal_mvp_enabled_flag shall be equal to 0. no_temporal_mvp_constraint_flag
equal to 0 does not impose such a constraint. When intra_only_constraint_flag is equal to
1, the value of no_temporal_mvp_constraint_flag shall be equal to 1.
no_sbtmvp_constraint_flag equal to 1 specifies that sps_sbtmvp_enabled_flag shall be
equal to 0. no_sbtmvp_constraint_flag equal to 0 does not impose such a constraint. When
no_temporal_mvp_constraint_flag is equal to 1, the value of no_sbtmvp_constraint_flag
shall be equal to 1.
no_amvr_constraint_flag equal to 1 specifies that sps_amvr_enabled_flag shall be equal
to 0. no_amvr_constraint_flag equal to 0 does not impose such a constraint. When
intra_only_constraint_flag is equal to 1, the value of no_amvr_constraint_flag shall be
equal to 1.
no_bdof_constraint_flag equal to 1 specifies that sps_bdof_enabled_flag shall be equal to
0. no_bdof_constraint_flag equal to 0 does not impose such a constraint. When
intra_only_constraint_flag is equal to 1, the value of no_bdof_constraint_flag shall be
equal to 1.
no_dmvr_constraint_flag equal to 1 specifies that sps_dmvr_enabled_flag shall be equal
to 0. no_dmvr_constraint_flag equal to 0 does not impose such a constraint. When
intra_only_constraint_flag is equal to 1, the value of no_dmvr_constraint_flag shall be
equal to 1.
no_cclm_constraint_flag equal to 1 specifies that sps_cclm_enabled_flag shall be equal to
0. no_cclm_constraint_flag equal to 0 does not impose such a constraint. When
max_chroma_format_constraint_idc is equal to 0, the value of no_cclm_constraint_flag
shall be equal to 1.
no_mts_constraint_flag equal to 1 specifies that sps_mts_enabled_flag shall be equal to 0.
no_mts_constraint_flag equal to 0 does not impose such a constraint.
no_sbt_constraint_flag equal to 1 specifies that sps_sbt_enabled_flag shall be equal to 0.
no_sbt_constraint_flag equal to 0 does not impose such a constraint.
no_lfnst_constraint_flag equal to 1 specifies that sps_lfnst_enabled_flag shall be equal to
0. no_lfnst_constraint_flag equal to 0 does not impose such a constraint.
no_affine_motion_constraint_flag equal to 1 specifies that sps_affine_enabled_flag shall
be equal to 0. no_affine_motion_constraint_flag equal to 0 does not impose such a
constraint. When intra_only_constraint_flag is equal to 1, the value of
no_affine_motion_constraint_flag shall be equal to 1.
no_mmvd_constraint_flag equal to 1 specifies that sps_mmvd_enabled_flag shall be
equal to 0. no_mmvd_constraint_flag equal to 0 does not impose such a constraint. When
intra_only_constraint_flag is equal to 1, the value of no_mmvd_constraint_flag shall be
equal to 1.
no_smvd_constraint_flag equal to 1 specifies that sps_smvd_enabled_flag shall be equal
to 0. no_smvd_constraint_flag equal to 0 does not impose such a constraint. When
intra_only_constraint_flag is equal to 1, the value of no_smvd_constraint_flag shall be
equal to 1.
no_prof_constraint_flag equal to 1 specifies that sps_affine_prof_enabled_flag shall be
equal to 0. no_prof_constraint_flag equal to 0 does not impose such a constraint. When
intra_only_constraint_flag is equal to 1, the value of no_prof_constraint_flag shall be equal
to 1.
no_bcw_constraint_flag equal to 1 specifies that sps_bcw_enabled_flag shall be equal to
0. no_bcw_constraint_flag equal to 0 does not impose such a constraint. When
intra_only_constraint_flag is equal to 1, the value of no_bcw_constraint_flag shall be equal
to 1.
no_ibc_constraint_flag equal to 1 specifies that sps_ibc_enabled_flag shall be equal to 0.
no_ibc_constraint_flag equal to 0 does not impose such a constraint.
no_ciip_constraint_flag equal to 1 specifies that sps_ciip_enabled_flag shall be equal to
0. no_cipp_constraint_flag equal to 0 does not impose such a constraint. When
intra_only_constraint_flag is equal to 1, the value of no_cipp_constraint_flag shall be equal
to 1.
no_gpm_constraint_flag equal to 1 specifies that sps_gpm_enabled_flag shall be equal to
0. no_gpm_constraint_flag equal to 0 does not impose such a constraint. When
intra_only_constraint_flag is equal to 1, the value of no_gpm_constraint_flag shall be
equal to 1.
no_ladf_constraint_flag equal to 1 specifies that sps_ladf_enabled_flag shall be equal to
0. no_ladf_constraint_flag equal to 0 does not impose such a constraint.
no_transform_skip constraint_flag equal to 1 specifies that
sps_transform_skip_enabled flag shall be equal to 0. no_transform_skip_constraint_flag
equal to 0 does not impose such a constraint.
no_bdpcm_constraint_flag equal to 1 specifies that sps_bdpcm_enabled_flag shall be
equal to 0. no_bdpcm_constraint_flag equal to 0 does not impose such a constraint.
no_palette_constraint_flag equal to 1 specifies that sps_palette_enabled_flag shall be
equal to 0. no_palette_constraint_flag equal to 0 does not impose such a constraint.
no_act_constraint_flag equal to 1 specifies that sps_act_enabled_flag shall be equal to 0.
no_act_constraint_flag equal to 0 does not impose such a constraint.
no_lmcs_constraint_flag equal to 1 specifies that sps_lmcs_enabled_flag shall be equal to
0. no_lmcs_constraint_flag equal to 0 does not impose such a constraint.
no_cu_qp_delta_constraint_flag equal to 1 specifies that pps_cu_qp_delta_enabled_flag
shall be equal to 0. no_cu_qp_delta_constraint_flag equal to 0 does not impose such a
constraint.

TABLE 2-continued

General constraint information semantics no_chroma_qp_offset_constraint_flag equal to 1 specifies that
pps_cu_chroma_qp_offset_list_enabled_flag shall be equal to 0.
no_chroma_qp_offset_constraint_flag equal to 0 does not impose such a constraint.
no_dep_quant_constraint_flag equal to 1 specifies that sps_dep_quant_enabled_flag
shall be equal to 0. no_dep_quant_constraint_flag equal to 0 does not impose such a
constraint.
no_sign_data_hiding_constraint_flag equal to 1 specifies that
sps_sign_data_hiding_enabled_flag shall be equal to 0.
no_sign_data_hiding_constraint_flag equal to 0 does not impose such a constraint.
no_tsrc_constraint_flag equal to 1 specifies that sh_ts_residual_coding_disabled_flag
shall be equal to 0. no_tsrc_constraint_flag equal to 0 does not impose such a constraint.
no_mixed_nalu_types_in_pic_constraint_flag equal to 1 specifies that it is a requirement
of bitstream conformance that pps_mixed_nalu_types_in_pic_flag shall be equal to 0.
no_mixed_nalu_types_in_pic_constraint_flag equal to 0 does not impose such a constraint.
no_trail_constraint_flag equal to 1 specifies that there shall be no NAL unit with
nuh_unit_type equal to TRAIL_NUT present in OlsInScope. no_trail_constraint_flag equal
to 0 does not impose such a constraint.
no_stsa_constraint_flag equal to 1 specifies that there shall be no NAL unit with
nuh_unit_type equal to STSA_NUT present in OlsInScope. no_stsa_constraint_flag equal
to 0 does not impose such a constraint.
no_rasl_constraint_flag equal to 1 specifies that there shall be no NAL unit with
nuh_unit_type equal to RASL_NUT present in OlsInScope. no_rasl_constraint_flag equal
to 0 does not impose such a constraint.
no_radl_constraint_flag equal to 1 specifies that there shall be no NAL unit with
nuh_unit_type equal to RADL_NUT present in OlsInScope. no_radl_constraint_flag equal
to 0 does not impose such a constraint.
no_idr_constraint_flag equal to 1 specifies that there shall be no NAL unit with
nuh_unit_type equal to IDR_W_RADL or IDR_N_LP present in OlsInScope.
no_idr_constraint_flag equal to 0 does not impose such a constraint.
no_cra_constraint_flag equal to 1 specifies that there shall be no NAL unit with
nuh_unit_type equal to CRA_NUT present in OlsInScope. no_cra_constraint_flag equal to
0 does not impose such a constraint.
no_gdr_constraint_flag equal to 1 specifies that sps_gdr_enabled_flag shall be equal to 0.
no_gdr_constraint_flag equal to 0 does not impose such a constraint.
no_aps_constraint_flag equal to 1 specifies that there shall be no NAL unit with
nuh_unit_type equal to PREFIX_APS_NUT or SUFFIX_APS_NUT present in
OlsInScope, and the sps_lmcs_enabled_flag and sps_scaling_list_enabled_flag shall both
be equal to 0. no_aps_constraint_flag equal to 0 does not impose such a constraint.
gci_alignment_zero_bits shall be equal to 0.
gci_num_reserved_bytes specifies the number of the reserved constraint bytes. The value
of gci_num_reserved_bytes shall be 0. Other values of gci_num_reserved_bytes are
reserved for future use by ITU-T | ISO/IEC and shall not be present in bitstreams
conforming to this version of this Specification.
gci_reserved_byte[ i ] may have any value. Its presence and value do not affect decoder
conformance to profiles specified in this version of this Specification. Decoders
conforming to this version of this Specification shall ignore the values of all the
gci_reserved_byte[ i ] syntax elements.

VVC's picture parameter set (PPS) contains such information which could change from picture to picture. The PPS includes information roughly comparable to what was part of the PPS in HEVC, including: 1) a self-reference; 2) initial picture control information such as initial quantization parameter (QP), a number of flags indicating the use of, or presence of, certain tools or control information in the slice header; and 3) tiling information.

The slice header contains information that can change from slice to slice, as well as such picture related information that is relatively small or relevant only for a certain slice or picture types. The size of slice header may be noticeably bigger than the PPS, particularly when there are tile or wavefront entry point offsets in the slice header and RPS, prediction weights, or reference picture list modifications are explicitly signaled.

Improvements to General Constraint Information

In the current VVC, no_sbt_constraint_flag is signaled in the general constraint information without any constraint. However, the feature controlled by the flag no_sbt_constraint_flag is only applicable when the slice is an inter slice. Therefore, when the slice is an intra slice, the value of no_sbt_constraint_flag shall be equal to 1.

Similarly, no_act_constraint_flag and no_chroma_qp_offset_constraint_flag are signaled in the general constraint information without any constraint. However, the features controlled by the flags no_act_constraint_flag and no_chroma_qp_offset_constraint_flag are only applicable when the chroma format is not monochrome. Therefore, the value of these two flags shall be equal to 1 when the chroma format is monochrome.

Similarly, in another example, no_mixed_nalu_types_in_pic_constraint_flag is signaled in the general constraint information without any constraint. However, the feature controlled by the flag no_mixed_nalu_types_in_pic_constraint_flag is only applicable when the picture has at least two subpictures. Therefore, the value of no_mixed_nalu_types_in_pic_constraint_flag shall be equal to 1 when the picture has one subpicture.

Similarly, in yet another example, no_prof_constraint_flag is signaled in the general constraint information without any constraint. However, the feature controlled by the flag no_prof_constraint_flag is only applicable when the affine mode is enabled. Therefore, the value of no_prof_constraint_flag shall be equal to 1 when the affine mode is disabled.

Similarly, in one more example, no_bdpcm_constraint_flag is signaled in the general constraint information without any constraint. However, the feature controlled by the flag no_bdpcm_constraint_flag is only applicable when the transform skip mode is enabled. Therefore, the value of no_bdpcm_constraint_flag shall be equal to 1 when the transform skip mode is disabled.

It is also observed that in the current VVC, several coding tools are missing in the general constraint information syntax. These coding tool flags should be added to provide the same general constraint controls as others.

Proposed Methods

In this disclosure, to address the issues as pointed out in the "problem statement" section, methods are provided to simplify and/or further improve the existing design of the high-level syntax. It is noted that the invented methods could be applied independently or jointly.

Since the feature controlled by the flag no_sbt_constraint_flag is only applicable when the slice is an inter slice, according to a method of the disclosure, it is proposed to add the constraint that the value of no_sbt_constraint_flag shall be equal to 1 when the slice is an intra slice. An example of the decoding process on VVC Draft is illustrated in Table 3 provided below. The changes to the VVC Draft are shown in bold and italic font.

TABLE 3

| Proposed flag |
| --- |
| no_sbt_constraint_flag equal to 1 specifies that sps_sbt_enabled_flag shall be equal to 0. no_sbt_constraint_flag equal to 0 does not impose such a constraint*When intra_only_constraint_flag is equal to 1, the value of no_sbt_constraint_flag shall be equal to 1.* |

Figure 4:
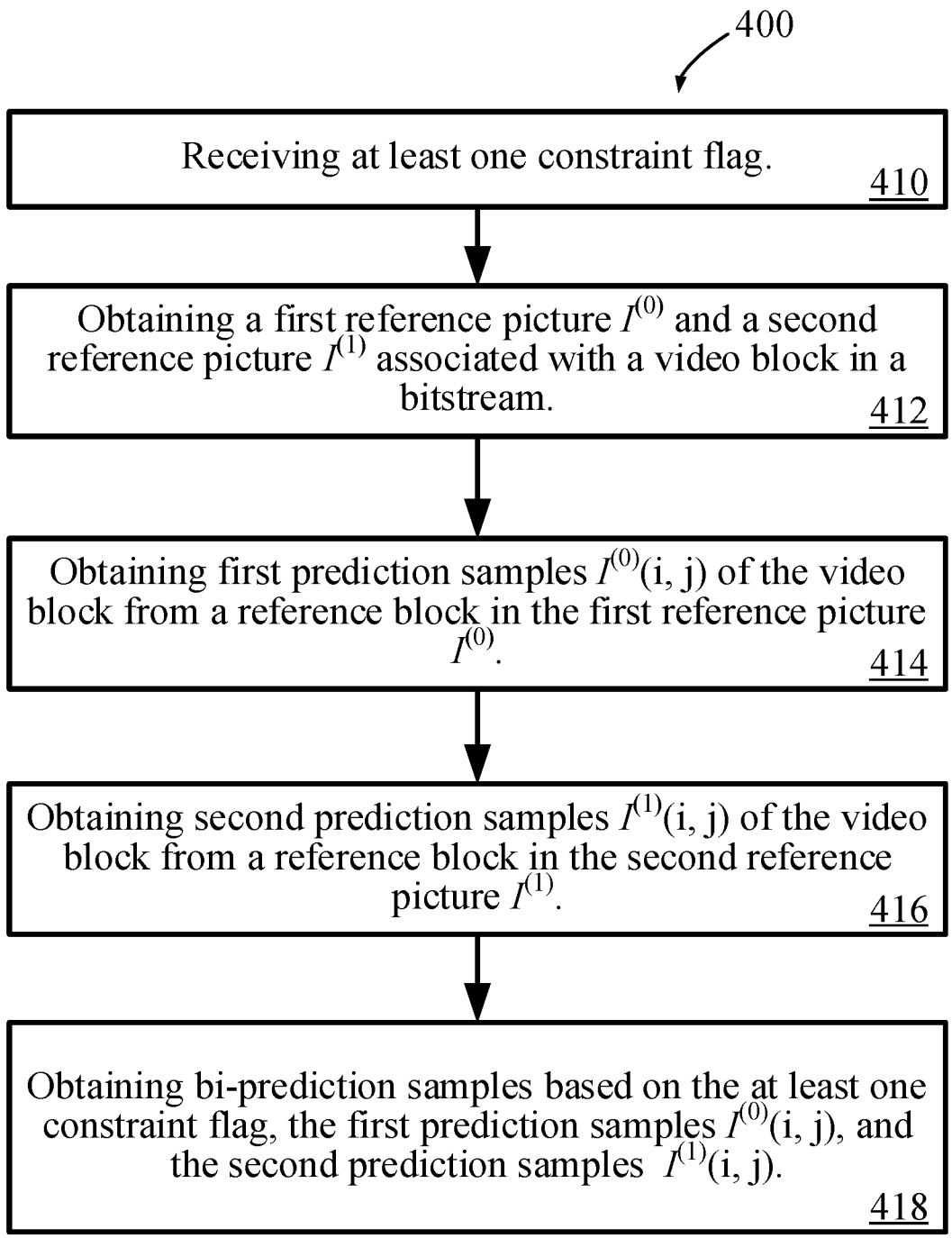
FIG. 4 is a method for decoding a video signal, according to an example of the present disclosure.

FIG. 4 shows a method for decoding a video signal in accordance with the present disclosure. The method may be, for example, applied to a decoder.

In step 410, the decoder may receive at least one constraint flag. The at least one constraint flag indicates whether a slice is an intra slice.

In step 412, the decoder may obtain a first reference picture $I^{(0)}$ and a second reference picture $I^{(1)}$ associated with a video block in a bitstream. The first reference picture $I^{(0)}$ may be before a current picture and the second reference picture $I^{(1)}$ may be after the current picture in display order.

In step 414, the decoder may obtain first prediction samples $I^{(0)}(i,j)$ of the video block from a reference block in the first reference picture $I^{(0)}$. The i and j represent a coordinate of one sample with the current picture.

In step 416, the decoder may obtain second prediction samples $I^{(1)}(i,j)$ of the video block from a reference block in the second reference picture $I^{(1)}$.

In step 418, the decoder may obtain bi-prediction samples based on the at least one constraint flag, the first prediction samples $I^{(0)}(i,j)$, and the second prediction samples $I^{(1)}(i,j)$.

Since the features controlled by the flags no_act_constraint_flag and no_chroma_qp_offset_constraint_flag are only applicable when the chroma format is not monochrome, according to a method of the disclosure, it is proposed to add the constraint that the value of these two flags shall be equal to 1 when the chroma format is monochrome. An example of the decoding process on VVC Draft is illustrated in Table 4 below. The changes to the VVC Draft are shown in bold and italic font.

TABLE 4

| Proposed flag |
| --- |
| no_act_constraint_flag equal to 1 specifies that sps_act_enabled_flag shall be equal to 0. no_act_constraint_flag equal to 0 does not impose such a constraint*When max_chroma_format_constraint_idc is equal to 0,the value of no_act_constraint_flag shall be equal to 1.* |
| no_chroma_qp_offset_constraint_flag equal to 1 specifies that pps_cu_chroma_qp_offset_list_enabled_flag shall be equal to 0. no_chroma_qp_offset_constraint_flag equal to 0 does not impose such a constraint*When max_chroma_format_constraint_idc is equal to 0,the value of no_chroma_qp_offset_constraint_flag shall be equal to 1.* |

Figure 5:
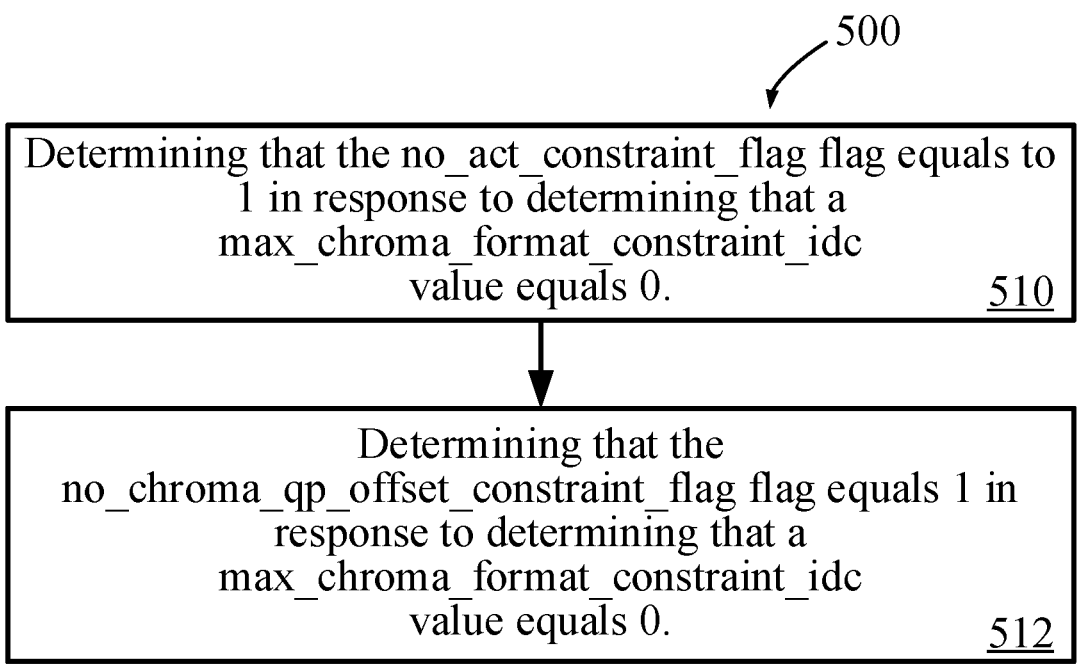
FIG. 5 is a method for decoding a video signal, according to an example of the present disclosure.

FIG. 5 shows a method for decoding a video signal in accordance with the present disclosure. The method may be, for example, applied to a decoder.

In step 510, the decoder may determine that the no_act_constraint_flag flag equals to 1 in response to determining that a max_chroma_format_constraint_idc value equals 0.

In step 512, the decoder may determine that the no_chroma_qp_offset_constraint_flag flag equals 1 in response to determining that a max_chroma_format_constraint_idc value equals 0.

Another example of the decoding process on VVC Draft is illustrated in Table 5 below. The changes to the VVC Draft are shown in bold and italic font.

TABLE 5

| Proposed flag |
|---|
| no_act_constraint_flag equal to 1 specifies that sps_act_enabled_flag shall be equal to 0. no_act_constraint_flag equal to 0 does not impose such a constraint. *When max_chroma_format_constraint_idc is not equal to 3, the value of no_act_constraint_flag shall be equal to 1.* no_chroma_qp_offset_constraint_flag equal to 1 specifies that pps_cu_chroma_qp_offset_list_enabled_flag shall be equal to 0. no_chroma_qp_offset_constraint_flag equal to 0 does not impose such a constraint. *When max_chroma_format_constraint_idc is equal to 0, the value of no_chroma_qp_offset_constraint_flag shall be equal to 1.* |

Since the feature controlled by the flag no_mixed_nalu_types_in_pic_constraint_flag is only applicable when the picture has at least two subpictures, according to a method of the disclosure, it is proposed to add the constraint that the value of no_mixed_nalu_types_in_pic_constraint_flag shall be equal to 1 when the picture has one subpicture. An example of the decoding process on VVC Draft is illustrated in Table 6 below. The changes to the VVC Draft are shown in bold and italic font.

TABLE 6

| Proposed Flag |
|---|
| no_mixed_nalu_types_in_pic_constraint_flag equal to 1 specifies that it is a requirement of bitstream conformance that pps_mixed_nalu_types_in_pic_flag shall be equal to 0. no_mixed_nalu_types_in_pic_constraint_flag equal to 0 does not impose such a constraint. *When one_subpic_per_pic_constraint_flag is equal to 1, the value of no_mixed_nalu_types in_pic_constraint_flag shall be equal to 1.* |

Since the feature controlled by the flag no_prof_constraint_flag is only applicable when the affine mode is enabled, according to a method of the disclosure, it is proposed to add the constraint that the value of no_prof_constraint_flag shall be equal to 1 when the affine mode is disabled. An example of the decoding process on VVC Draft is illustrated in Table 7 below. The changes to the VVC Draft are shown in bold and italic font.

TABLE 7

| Proposed Flag |
|---|
| no_prof_constraint_flag equal to 1 specifies that sps_affine_prof_enabled_flag shall be equal to 0. no_prof_constraint_flag equal to 0 does not impose such a constraint. When intra_only_constraint_flag is equal to 1, the value of no_prof_constraint_flag shall be equal to 1. *When no_affine_motion_constraint_flag is equal to 1, the value of no_prof_constraint_flag shall be equal to 1.* |

Since the feature controlled by the flag no_bdpcm_constraint_flag is only applicable when the transform skip mode is enabled, according to a method of the disclosure, it is proposed to add the constraint that the value of no_bdpcm_constraint_flag shall be equal to 1 when the transform skip mode is disabled. An example of the decoding process on VVC Draft is illustrated in Table 8 below. The changes to the VVC Draft are shown in bold and italic font.

TABLE 8

Proposed Flag no_bdpcm_constraint_flag equal to 1 specifies that sps_bdpcm_enabled_flag shall be equal to 0. no_bdpcm_constraint_flag equal to 0 does not impose such a constraint*When no_transform_skip_constraint flag is equal to 1,the value of no_bdpcm_constraint_flag shall be equal to 1.*

Several coding tools are missing in the general constraint information syntax. These coding tool flags should be added to provide the same general constraint controls as others.

In the current VVC, sps_conformance_window_flag equal to 1 indicates that the conformance cropping window offset parameters follow next in the SPS. According to the disclosure, it is proposed to add the flag of cropping function, no_conformance_window_constraint_flag, in the general constraint information syntax to provide the same general constraint controls as others. An example of the decoding process on VVC Draft is illustrated in Tables 9 and 10 below, where the changes to the VVC Draft are shown in bold and italic font.

TABLE 9

Proposed Flag

| general_constraint_info( ) { | Descriptor |
|---|---|
| ... | |
| *no_conformance_window_constraint_flag* | *u(1)* |
| ... | |
| } | |

TABLE 10

Proposed flag

*no_conformance_window_constraint_flag equal to1 specifies that sps_conformance_window_flag shall be equal to 0.*
*no_conformance_window_constraint_flag equal to 0 does not impose such a constraint.*

In the current VVC, sps_weighted_pred_flag equal to 1 specifies that weighted prediction may be applied to P slices referring to the SPS. sps_weighted_pred_flag equal to 0 specifies that weighted prediction is not applied to P slices referring to the SPS. According to the disclosure, it is proposed to add the syntax element, no_weighted_pred_constraint_flag, in the general constraint information syntax to provide the same general constraint controls as others. An example of the decoding process on VVC Draft is illustrated in Tables 11 and 12 below. The changes to the VVC Draft are shown in bold and italic font. Additionally, given that weighted prediction is only applicable when inter-coding tools are allowed. Therefore, it is proposed to add one bitstream conformance constraint that the value of no_weighted_pred_constant_flag should be equal to 1, when only intra coding is allowed for coding the sequence.

TABLE 11

Proposed flag

| general_constraint_info( ) { | Descriptor |
|---|---|
| ... | |
| *no_weighted_pred_constraint_flag* | *u(1)* |
| ... | |
| } | |

TABLE 12

Proposed flag

*no_weighted_pred_constraint_flag equal to 1specifies that sps_weighted_pred_flag shall be equal to 0. no_weighted_pred_constraint_flagequal to 0 does notimpose such a constraint. When intra_only_constraint_flag isequal to 1, the value of no_weighted_pred_constraint_flag shall be equal to 1.When intra_only_constraint_flag is equal to 1, thevalue of no_weighted_pred_constraint_flag shall be equal to 1.*

In the current VVC, sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS. According to the disclosure, it is proposed to add the syntax element, no_weighted_bipred_constraint_flag, in the general constraint information syntax to provide the same general constraint controls as others. An example of the decoding process on VVC Draft is illustrated in Tables 13 and 14 below. The changes to the VVC Draft are shown in bold and italic font. Additionally, it is proposed to add one bitstream conformance constraint that the value of no_weight_bipred_constraint_flag should be equal to one, when only intra coding is allowed for coding the sequence.

TABLE 13

Proposed flag

| general_constraint_info( ) { | Descriptor |
|---|---|
| ... | |
| *no_weighted_bipred_constraint_flag* | *u(1)* |
| ... | |
| } | |

TABLE 14

Proposed flag

*no_weighted_bipred_contraint_flag equal to1 specifies that sps_weighted_bipred_flag shall be equal to 0. no_ weighted_bipred_constraint_flag equal to 0 doesnot impose such a constraint. Whenintra_only_constraint_flagis equal to 1,the value of no_weighted_bipred_constraint_flag shall beequal to 1. When intra_only_constraint_flag is equal to 1, the valueof no_weighted_bipred_constraint_flag shallbe equal to 1.*

In the current VVC, sps_virtual_boundaries_enabled_flag equal to 1 specifies that disabling in-loop filtering across virtual boundaries is enabled and may be applied in the coded pictures in the CLVS. sps_virtual_boundaries_enabled_flag equal to 0 specifies that disabling in-loop filtering across virtual boundaries is disabled and not applied in the coded pictures in the CLVS. In-loop filtering operations include the deblocking filter, sample adaptive offset filter, and adaptive loop filter operations. According to the disclosure, it is proposed to add the syntax element, no_virtual_boundaries_constraint_flag, in the general constraint information syntax to provide the same general constraint controls as others. An example of the decoding process on VVC Draft is illustrated in Tables 15 and 16 below. The changes to the VVC Draft are shown in bold and italic font.

TABLE 15

Proposed flag

| general_constraint_info( ) { | Descriptor |
|---|---|
| ... | |
| *no_virtual_boundaries_constraint_flag* | *u(1)* |
| ... | |
| } | |

TABLE 16

Proposed flag

*no_virtual_boundaries_constraint_flag equal to1 specifies thatsps_virtual_boundaries_enabled_flag shallbe equal to 0.no_virtual_boundaries_constraint_flag equal to 0 does not impose sucha constraint.*

In the current VVC draft, there are two flags, namely no_ref_pic_resampling_constraint_flag and no_res_change_in_clvs_constraint_flag, signaled in the general constraint information syntax table. The first flag indicates whether the reference picture resampling functionality is allowed in the coded sequence, while the second flag indicates whether the resolutions of the pictures in the coded sequence are allowed to be adjusted. Given that the pictures' resolutions can be different from each other only if the reference picture resampling is enabled, it is proposed to add one bitstream conformance constraint that the value of no_res_change_in_clvs_constraint_flag should be equal to one when the value of no_ref_pic_resampling_constraint_flag is equal to one, as specified as below. Meanwhile, given that reference picture resampling is one inter-coding functionality, it cannot be applied when only intra coding is allowed. Therefore, another bitstream conformance constraint is added to restrict the value of no_ref_pic_resampling_constraint_flag should be equal to one when only intra coding tools are allowed.

no_ref_pic_resampling_constraint_flag equal to 1 specifies that sps_ref_pic_resampling_enabled_flag shall be equal to 0. no_ref_pic_resampling_constraint_flag equal to 0 does not impose such a constraint. When intra_only_constraint_flag is equal to 1, the value of no_ref_pic_resampling_constraint_flag shall be equal to 1.

no_res_change_in_clvs_constraint_flag equal to 1 specifies that sps_res_change_in_clvs_allowed_flag shall be equal to 0. no_res_change_in_clvs_constraint_flag equal to 0 does not impose such a constraint. When the value of no_ref_pic_resampling_constraint_flag is equal to one, the value of no_res_change_in_clvs_constraint_flag should be equal to one.

Figure 6:
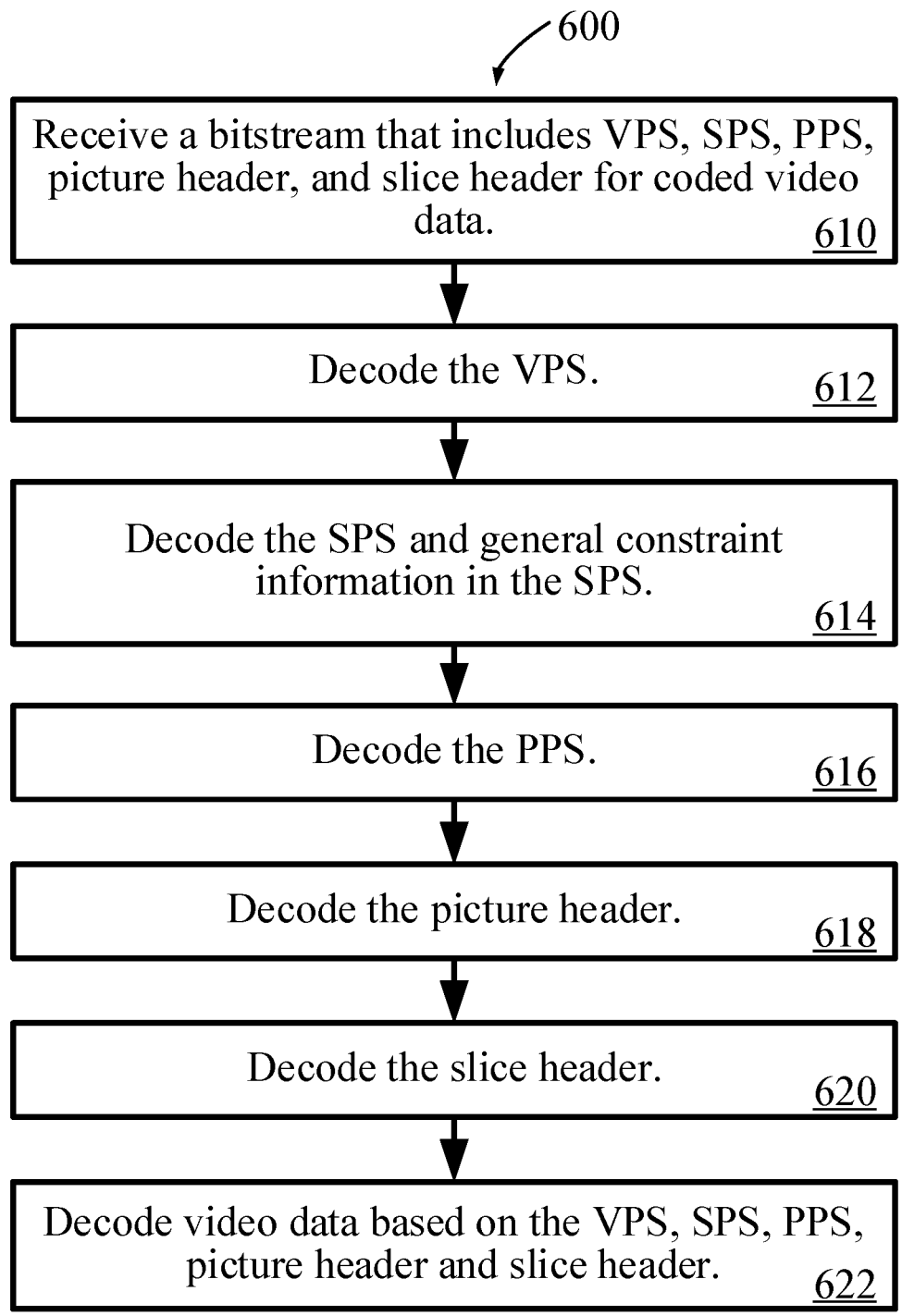
FIG. 6 is a method for decoding a video signal, according to an example of the present disclosure.

FIG. 6 shows a method for decoding a video signal in accordance with the present disclosure. The method may be, for example, applied to a decoder.

In step 610, the decoder may receive a bitstream that includes VPS, SPS, PPS, picture header, and slice header for coded video data.

In step 612, the decoder may decode the VPS.

In step 614, the decoder may decode the SPS and may decode general constraint information in the SPS.

In step 616, the decoder may decode the PPS.

In step 618, the decoder may decode the picture header.

In step 620, the decoder may decode the slice header.

In step 622, the decoder may decode the video data based on VPS, SPS, PPS, picture header, and slice header.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

FIG. 7 shows a computing environment 710 coupled with a user interface 760. The computing environment 710 can be part of a data processing server. The computing environment 710 includes processor 720, memory 740, and I/O interface 750.

The processor 720 typically controls overall operations of the computing environment 710, such as the operations associated with the display, data acquisition, data communications, and image processing. The processor 720 may include one or more processors to execute instructions to perform all or some of the steps in the above-described methods. Moreover, the processor 720 may include one or more modules that facilitate the interaction between the processor 720 and other components. The processor may be a Central Processing Unit (CPU), a microprocessor, a single chip machine, a GPU, or the like.

The memory 740 is configured to store various types of data to support the operation of the computing environment 710. Memory 740 may include predetermine software 742. Examples of such data include instructions for any applications or methods operated on the computing environment 710, video datasets, image data, etc. The memory 740 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 750 provides an interface between the processor 720 and peripheral interface modules, such as a keyboard, a click wheel, buttons, and the like. The buttons may include but are not limited to, a home button, a start scan button, and a stop scan button. The I/O interface 750 can be coupled with an encoder and decoder.

In some embodiments, there is also provided a non-transitory computer-readable storage medium comprising a plurality of programs, such as comprised in the memory 740, executable by the processor 720 in the computing environment 710, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 710 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof

What is claimed is:

1. A method for decoding a video signal, comprising:
   receiving, by a decoder, constraint flags, wherein at least one of the constraint flags indicates whether a slice is an intra slice; and
   obtaining, at the decoder, prediction samples based on the at least one of the constraint flags;
   wherein the constraint flags comprise a single constraint flag that is different than the at least one of the constraint flags indicating whether a slice is an intra slice, and wherein the single constraint flag equaling to 1 indicates that sps_weighted_pred_flag and sps_weighted_bipred_flag shall both be equal to 0.

2. The method of claim 1, wherein the at least one constraint flag is an intra_only_constraint_flag flag.

3. The method of claim 1, wherein the constraint flags comprise a no_virtual_boundaries_constraint_flag flag to indicate whether disabling in-loop filtering across virtual boundaries is disabled in a coded layer video sequence (CLVS).

4. The method of claim 3, further comprising:
   determining that a sps_virtual_boundaries_enabled_flag flag being equal to 0 in response to determining that the no_virtual_boundaries_constraint_flag flag being equal to 1.

5. The method of claim 1, wherein the constraint flags comprise:
   a no_ref_pic_resampling_constraint_flag flag to indicate whether sps_ref_pic_resampling_enabled_flag shall be equal to 0, and
   a no_res_change_in_clvs_constraint_flag flag to indicate whether sps_res_change_in_clvs_allowed_flag shall be equal to 0.

6. A computing device, comprising:
   one or more processors; and
   a non-transitory computer-readable storage medium storing instructions executable by the one or more processors, wherein the one or more processors are configured to:
   receive constraint flags, wherein at least one of the constraint flags indicates whether a slice is an intra slice; and
   obtain prediction samples based on the at least one of the constraint flags;
   wherein the constraint flags comprise a single constraint flag that is different than the at least one of the constraint flags indicating whether a slice is an intra slice, and wherein the single constraint flag equaling to 1 indicates that sps_weighted_pred_flag and sps_weighted_bipred_flag shall both be equal to 0.

7. The device of claim 6, wherein the at least one constraint flag is an intra_only_constraint_flag flag.

8. The device of claim 6, wherein the constraint flags comprise a no_virtual_boundaries_constraint_flag flag to indicate whether disabling in-loop filtering across virtual boundaries is disabled in a coded layer video sequence (CLVS).

9. The device of claim 8, the one or more processors are configured to:
 determine that a sps_virtual_boundaries_enabled_flag flag being equal to 0 in response to determining that the no_virtual_boundaries_constraint_flag flag being equal to 1.

10. The device of claim 6, wherein the constraint flags comprise:
 a no_ref_pic_resampling_constraint_flag flag to indicate whether sps_ref_pic_resampling_enabled_flag shall be equal to 0, and
 a no_res_change_in_clvs_constraint_flag flag to indicate whether sps_res_change_in_clvs_allowed_flag shall be equal to 0.

11. A non-transitory computer-readable storage medium storing a plurality of programs for execution by a computing device having one or more processors, wherein the plurality of programs, when executed by the one or more processors, cause the computing device to perform acts comprising:
 receiving, by a decoder, constraint flags, wherein at least one of the constraint flags indicates whether a slice is an intra slice; and
 obtaining, at the decoder, prediction samples based on the at least one of the constraint flags;
 wherein the constraint flags comprise a single constraint flag that is different than the at least one of the constraint flags indicating whether a slice is an intra slice, and wherein the single constraint flag equaling to 1 indicates that sps_weighted_pred_flag and sps_weighted_bipred_flag shall both be equal to 0.

12. The non-transitory computer-readable storage medium of claim 11, wherein the at least one constraint flag is an intra_only_constraint_flag flag.

13. The non-transitory computer-readable storage medium of claim 11, wherein the constraint flags comprise a no_virtual_boundaries_constraint_flag flag to indicate whether disabling in-loop filtering across virtual boundaries is disabled in a coded layer video sequence (CLVS).

14. The non-transitory computer-readable storage medium of claim 13, the plurality of programs, when executed by the one or more processors, cause the computing device to:
 determine that a sps_virtual_boundaries_enabled_flag flag being equal to 0 in response to determining that the no_virtual_boundaries_constraint_flag flag being equal to 1.

15. The non-transitory computer-readable storage medium of claim 13, wherein the constraint flags comprise:
 a no_ref_pic_resampling_constraint_flag flag to indicate whether sps_ref_pic_resampling_enabled_flag shall be equal to 0, and
 a no_res_change_in_clvs_constraint_flag flag to indicate whether sps_res_change_in_clvs_allowed_flag shall be equal to 0.

* * * * *